(12) United States Patent  
Schaye

(10) Patent No.: US 12,253,234 B1
(45) Date of Patent: Mar. 18, 2025

(54) LICENSE PLATE MOUNTABLE AFTERMARKET LIGHT ASSEMBLY FOR VEHICLE FRONT ALERT

(71) Applicant: Pedestrian Safety Solutions, LLC, New York, NY (US)

(72) Inventor: Paul L. Schaye, Delray Beach, FL (US)

(73) Assignee: Pedestrian Safety Solutions, LLC, New York, NY (US)

( * ) Notice: Subject to any disclaimer, the term of this patent is extended or adjusted under 35 U.S.C. 154(b) by 0 days.

(21) Appl. No.: 18/825,170

(22) Filed: Sep. 5, 2024

Related U.S. Application Data

(60) Provisional application No. 63/539,174, filed on Sep. 19, 2023.

(51) Int. Cl.

| | |
|---|---|
| *F21S 43/14* | (2018.01) |
| *B60Q 1/26* | (2006.01) |
| *B60Q 1/34* | (2006.01) |
| *B60Q 1/44* | (2006.01) |
| *B60Q 1/54* | (2006.01) |
| *F21S 43/15* | (2018.01) |
| *F21S 45/10* | (2018.01) |
| *F21S 45/50* | (2018.01) |
| *F21V 23/04* | (2006.01) |
| *F21Y 113/13* | (2016.01) |

(52) U.S. Cl.
CPC ............ *F21S 43/14* (2018.01); *B60Q 1/2696* (2013.01); *B60Q 1/346* (2013.01); *B60Q 1/44* (2013.01); *B60Q 1/54* (2013.01); *F21S 43/15* (2018.01); *F21S 45/10* (2018.01); *F21V 23/0464* (2013.01); *F21V 23/0492* (2013.01); *F21S 45/50* (2018.01); *F21Y 2113/13* (2016.08)

(58) Field of Classification Search
CPC . F21S 43/14; F21S 45/10; F21S 43/15; B60Q 1/2696; B60Q 1/346; B60Q 1/44; B60Q 1/54; F21V 23/0464; F21V 23/0492
See application file for complete search history.

(56) References Cited

U.S. PATENT DOCUMENTS

| | | | |
|---|---|---|---|
| 9,352,685 B1 * | 5/2016 | Abramowitz | ............ B60Q 1/44 |
| 9,655,390 B2 | 5/2017 | Davis | |
| 9,784,427 B2 | 10/2017 | Stemmer | |
| 9,918,025 B2 | 3/2018 | Ballatan | |
| 10,118,549 B2 * | 11/2018 | Farnaam | ................. B60Q 1/56 |
| 10,449,913 B2 | 10/2019 | Eiland | |

(Continued)

*Primary Examiner* — Bryon T Gyllstrom
(74) *Attorney, Agent, or Firm* — Dinsmore & Shohl LLP

(57) ABSTRACT

A license plate mountable aftermarket lighting assembly visual front alert system attached to a vehicle for instructing observers as to movement of the vehicle. A housing incorporates a plurality of illuminating elements configured in a strip extending substantially the length thereof and communicating with a processor also integrated into the body and incorporating a motion control circuitry. A forward facing translucent or transparent cover which is mounted over the front face of the housing. A power supply operating the processor and illuminating elements and, in response to a travel condition of the vehicle, the motion control circuitry outputs a signal to the processor which is representative of the vehicle movement, the processor in turn signaling the illuminating elements to generate a visual output corresponding to the signal.

22 Claims, 14 Drawing Sheets

(56) References Cited

U.S. PATENT DOCUMENTS

| | | | |
|---|---|---|---|
| 10,562,444 B1* | 2/2020 | Baker | B60R 13/105 |
| 10,654,408 B2 | 5/2020 | Nielsen | |
| 10,759,328 B2* | 9/2020 | Zizzadoro | B60Q 1/0076 |
| 10,981,496 B2* | 4/2021 | Schaye | F21S 43/14 |
| 11,453,352 B2 | 9/2022 | Albergaria | |
| 11,524,628 B2 | 12/2022 | Takori | |
| 11,568,772 B2* | 1/2023 | Boston | B60R 13/10 |
| 11,712,994 B1* | 8/2023 | Schaye | B60Q 1/28 |
| | | | 340/467 |
| 2011/0252675 A1* | 10/2011 | Thomas | B60Q 1/5037 |
| | | | 40/205 |
| 2013/0057398 A1* | 3/2013 | Wen | B60Q 1/0023 |
| | | | 340/435 |
| 2014/0090280 A1 | 4/2014 | Cunningham | |
| 2018/0319326 A1* | 11/2018 | Daylong | H05B 45/00 |
| 2019/0213931 A1* | 7/2019 | Brubaker | B60Q 1/2607 |
| 2024/0149784 A1* | 5/2024 | Schaye | B60Q 1/54 |

* cited by examiner

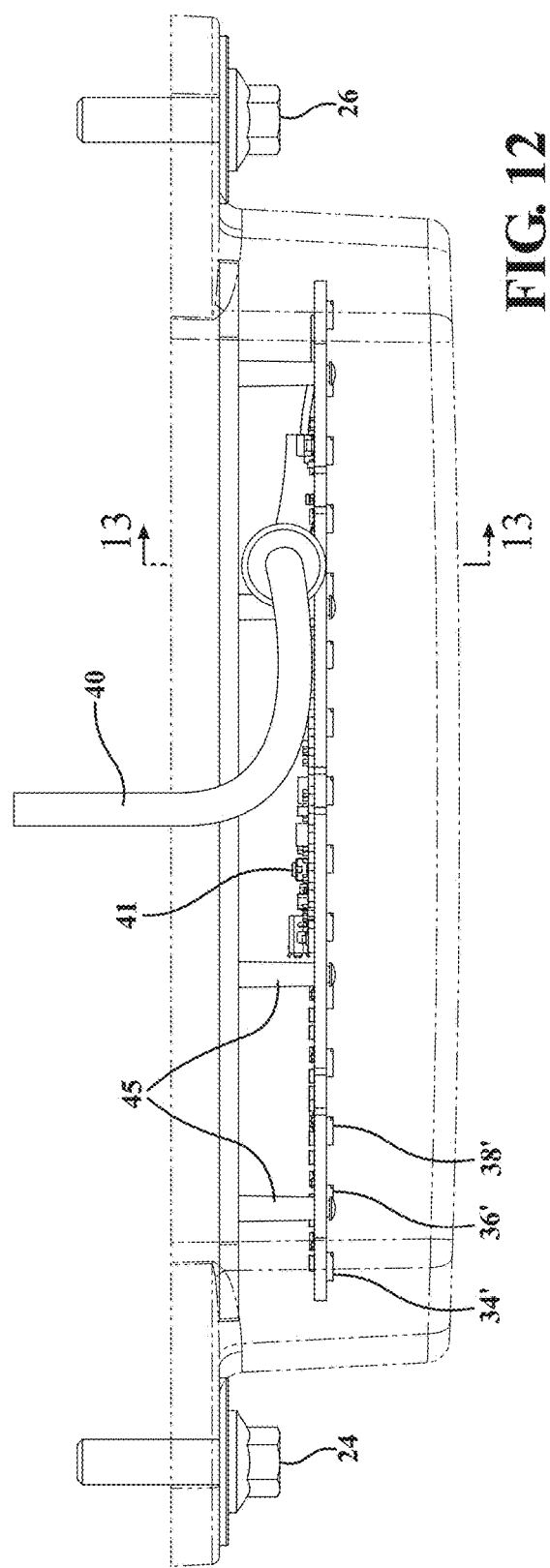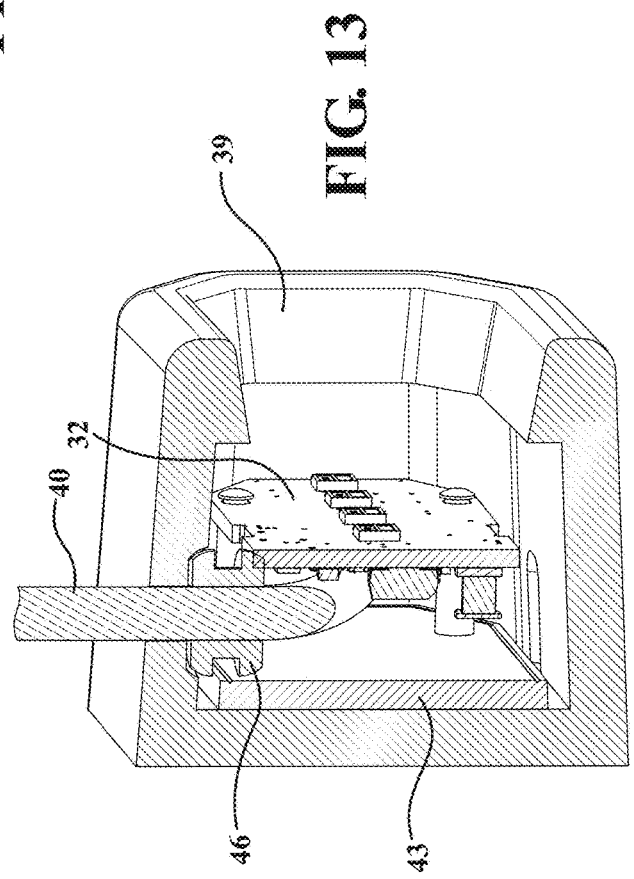

LICENSE PLATE MOUNTABLE AFTERMARKET LIGHT ASSEMBLY FOR VEHICLE FRONT ALERT

CROSS REFERENCE TO RELATED APPLICATIONS

The present application claims priority from U.S. Ser. No. 63/539,174 filed Sep. 19, 2023.

FIELD OF THE INVENTION

The present invention relates generally to vehicle mounted lighting assemblies. More specifically, the present invention teaches either of a license plate or vehicle grille mountable aftermarket lighting assembly which includes an environmentally sealed and weather resistant module for providing an illuminating front alert to other drivers and/or pedestrians, such representing the travel characteristics (slowing or going) associated with the subject vehicle.

BACKGROUND OF THE INVENTION

The prior art is documented with examples of visual alert systems, such as which can be mounted to a vehicle for notifying pedestrians and other drivers as to whether a subject vehicle is braking, accelerating or decelerating.

A first example is set forth in U.S. Pat. No. 10,981,496 to Schaye, and which teaches a visual deceleration apparatus for indicating vehicle deceleration. A housing is disclosed which is visible from a front of the vehicle and which incorporates a printed circuit board, an electrical connection and an accelerometer for signaling a plurality of LEDs to instruct the braking condition of the vehicle. An associated method is disclosed for creating a lighting pattern on a light strip associated with the LEDs for again instructing any of vehicle acceleration, deceleration, or braking.

U.S. Pat. No. 11,712,994, also to Schaye, teaches a similar version of a lighting system, also termed a visual deceleration apparatus, which can be incorporated into such as a license plate or grill and which includes a frame having a center section for holding a license plate. Two side sections include an arrangement of LED's which illuminate when the vehicle decelerates. Input to the LED circuitry may come from a brake system component, accelerometers, or other types of sensors as described above.

US 2015/0323149 to Salter teaches a photo luminescent lighting apparatus vehicle taillight including a partially light transmissive layer and at least one light generating layer configured to substantially coat a portion of the transmissive layer. The light generating layer comprises a plurality of electrodes and a plurality of LEDs in a semiconductor ink disposed between the electrodes. The light generating layer is operable to emit an excitation emission. The taillight further includes at least one photo luminescent layer proximate at least one of the electrodes configured to convert the excitation emission to an output emission.

Takori, U.S. Pat. No. 11,524,628 teaches a notification device in a vehicle which enables a person outside the vehicle to be notified of a predetermined operating state of the vehicle by the light emission, and includes: a plurality of spot-shaped light sources arranged at intervals to follow an upper edge of a windshield; a reflecting part reflecting light from the light sources to a front; an outer lens transmitting therethrough the light heading toward the front from the reflecting part; and a housing. The outer lens has on at least one of front and rear faces thereof a fine concave-convex face diffusing the light transmitted through the outer lens.

A number of existing assemblies are further provided which can be associated with a vehicle license plate. Boston et al. U.S. Pat. No. 11,568,772 teaches a display system for use on the exterior of a vehicle having a display, a vehicle speed sensor, and a processor coupled to the vehicle speed sensor. The processor is configured to implement one of three operational modes of the display system based on the speed and state of the vehicle, and including a first operational mode, wherein a first content, including identification and/or registration information of the vehicle is rendered on the display at a first power consumption level, a second operational mode, wherein a second content, including a message, identification and/or registration information of the vehicle, is rendered on the display, and a third operational mode, wherein content is rendered on the display at a second power consumption level less than the first power consumption level.

Thomas, US 2011/0252675A1, teaches a license plate display system for a vehicle with a series of indicia on a base. One of the indicia and the base are one of translucent and transparent, and the other of the base and the indicia being opaque. The license plate display system also includes an array of light emitting diodes (LEDs), with the array containing at least one LED of a first color and at least one LED of a second color. The array transmits light to the license plate.

Other known assemblies include each of the license plate illuminator of U.S. Pat. No. 9,918,025 to Ballatan and the illuminated license plate frame of U.S. Pat. No. 9,352,685 to Abramowitz.

SUMMARY OF THE INVENTION

The present invention discloses an aftermarket lighting assembly, which can be mounted to a vehicle license plate of front grille. In a preferred application, the assembly can further include a visual front alert system (VFAS), such as for instructing pedestrians or other drivers (collectively observers) as to the movement of a subject vehicle. In a particular and non-limiting application, the alert system indicates to the observer(s) located forward of the subject vehicle as to whether the vehicle is accelerating, maintaining a given speed, or is decelerating, the latter further indicative of a braking condition.

The alert system is provided as an environmentally sealing outer body, such as which can include a two-piece plasticized material construction which can be assembled in any fashion, including use of mechanical fasteners or sonic welding techniques. Without limitation, the assembly can be provided as such as an after-market adaptation to an existing vehicle, which is secured to a physical exterior location and connected to a power source extending from the vehicle battery.

The housing encloses one or more LED strips, this in combination with associated circuitry including a motion detecting (accelerometer) component. Without limitation, the elongated track or housing can include any transparent, translucent or light transmitting forward facing surface overlaying the LED illuminating strips.

The LED strips can, in one non-limiting application, including each of white and amber strips, which extend the length of the housing, with the strips each having a plurality of illuminating elements on a forward facing surface. Also included are wiring connections extending to a PC board assembly (also PCBA) with built in accelerometer for illuminating the LED's based on the vehicle movement. Without limitation, the individual LED strips can be subdivided into sub-pluralities of LED segments, which can be illuminated via signaling from the processor according to any alternating or succeeding pattern, such as in order to provide any animated pattern. The lighting patterns contemplated herein can further include the processor illuminating the LED's according to any single or multiple lights, flashing, fluctuating or illuminating intensity.

An electrical power supply is provided to the strip shaped body and, in a first application, includes a cable extending between the PCBA and a battery of the vehicle. In a further application, a portable battery (including any of 12V, Lithium ion or Nickel Cadmium can be substituted for a dedicated hookup connection for powering the PCBA, accelerometer and LEDs.

Additional options for powering the assembly can include accessing the vehicle on-board diagnostic (OBD) port. Other features can include utilizing the OBD port for accessing speed data, in addition or alternative to the use of an accelerometer component, such again via connecting the assembly to an ITM OEM and aftermarket devices to an OBD2 port associated with the assembly. Depending upon the application, this is beneficial for redundant data in the case of noise accelerometer data received, and/or for data fusion to improve performance of the assembly.

BRIEF DESCRIPTION OF THE DRAWINGS

Reference will now be made to the attached drawings, when read in combination with the following detailed description, wherein like reference numerals refer to like parts throughout the several views, and in which:

FIG. 12 is a width cutaway of the lighting assembly similar to as shown in FIG. 4A;

FIG. 13 is rotated cutaway view taken along line 13-13 of FIG. 12 and depicting the arrangement of interior components of the lighting assembly shown in FIG. 7, with the exception of a redesigned reflector component;

DETAILED DESCRIPTION OF THE PREFERRED EMBODIMENTS

With reference to the attached illustrations, the present invention discloses a license plate or, alternatively, a vehicle grille mountable aftermarket lighting assembly, the same including an environmentally sealed and weather resistant module for providing an illuminating front alert to other drivers and/or pedestrians, such representing the travel characteristics (slowing or going) associated with the subject vehicle.

Figure 1:
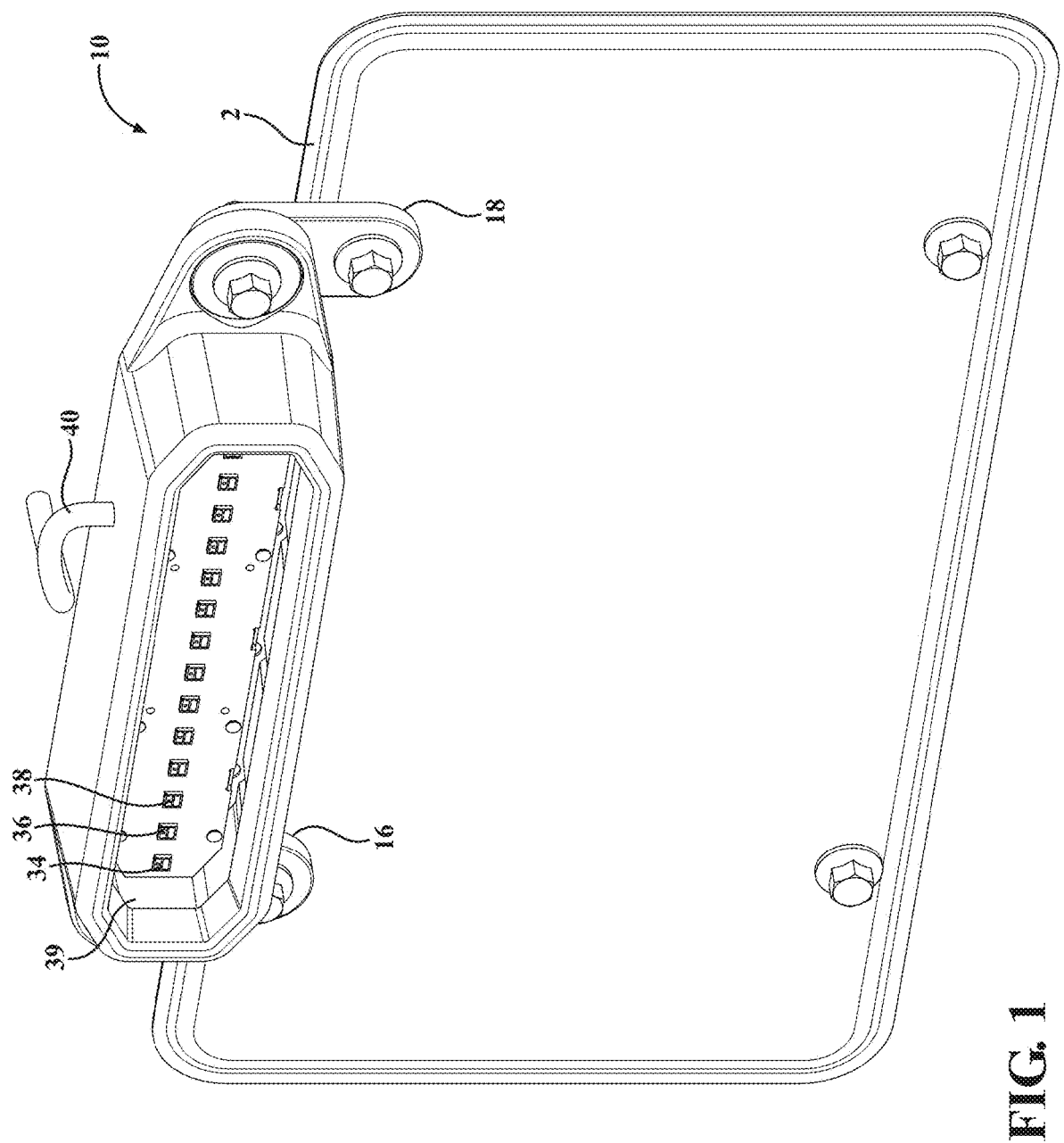
FIG. 1 is an environmental view of a license plate mountable aftermarket light or illuminating assembly according to a non-limiting variant of the present invention.
Figure 2:
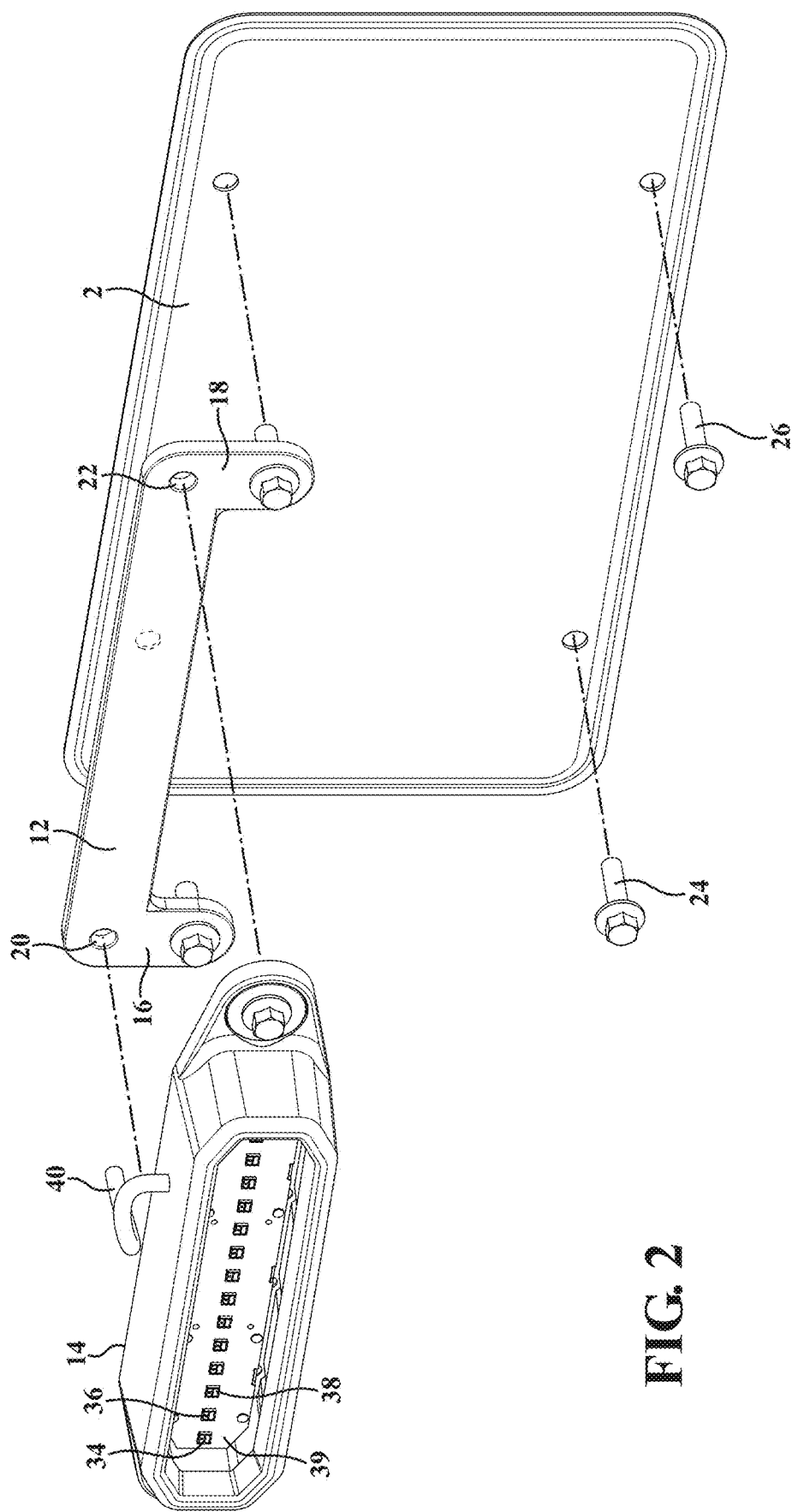
FIG. 2 is an exploded view of the mounting of the illuminating assembly of FIG. 1 and depicting the environmentally sealed module and mounting hardware for securing to a vehicle front license plate.

Referring to FIG. 1, an environmental view is generally depicted at 10 of an aftermarket light or illuminating assembly according to a non-limiting variant of the present invention. In a preferred application, the assembly 10 is mounted to a forward facing vehicle license plate 2. As further depicted in the exploded view of FIG. 2, the lighting assembly can include a bracket 12 to which is secured a main housing 14 of the assembly. Without limitation, the housing 14 can include any suitable material not limited to an injection molded plastic exhibiting any durometer rating and includes an upper aperture 15 for receiving the power wire (see as further depicted at 40).

The bracket 12 includes an elongated shape with angled ends 16/18, through which are formed apertures, depicted as first and second pairs and referenced at 20/22 for receiving mounting hardware (corresponding pairs of bolts 24/26) for mounting each of the assembly 10 to the bracket 12 and the bracket in turn to an upper aligning pair of inner circumferential rim defining apertures 28/30 of the license plate 2. The main housing 14 also includes aperture end tabs 25/27 which receive the bolts 24/26 for mounting to the upper apertures 20/22 located in the bracket 12. In this fashion, the aftermarket assembly mounts to the forward facing license plate 2 in a fashion, which permits it to be viewed without obscuring the alpha-numeric lettering of the license plate.

Figure 3:
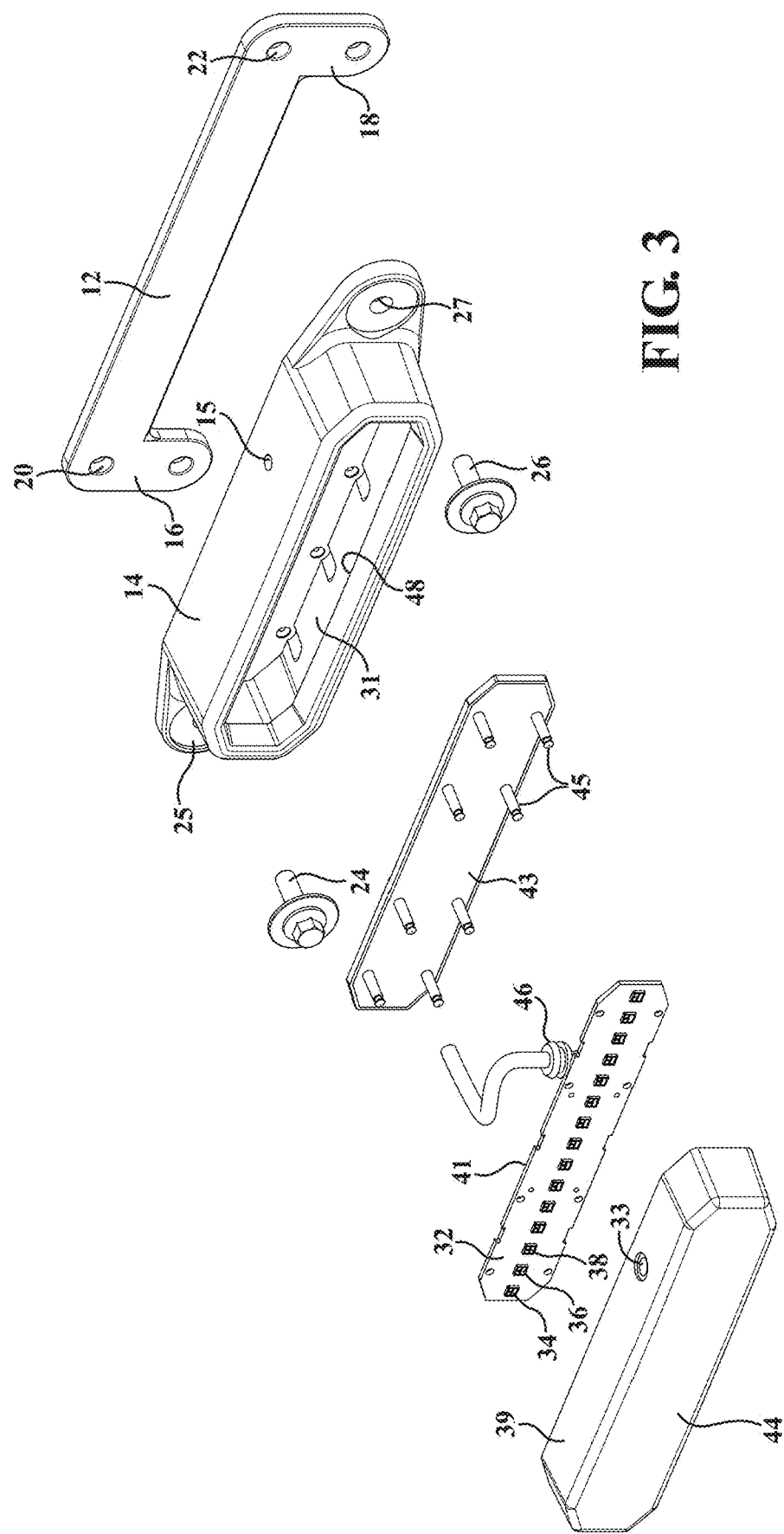
FIG. 3 presents a further exploded view of the illuminating assembly of FIG. 1.

FIG. 3 presents a further exploded view of the illuminating assembly of FIG. 1 which includes an illustration of an LED strip display 32 incorporated into the mountable light assembly. Without limitation, any of a single or plural stacked arrangement of illuminating elements, see at 34, 36, 38, et seq., are integrated within the strip display 32, such that illumination of the elements is visible through a forward facing translucent or transparent cover (see at 39) which can include a curved reflector 44 and is constructed from a high-impact polycarbonate or like material which is mounted over the front face of the housing 14.

The illuminating elements 34, 36, 38, et. seq. can, without limitation, include one or more individual strips of LED elements (the term LED or illuminating element being interchangeably referenced), with associated wiring connections including one or more connectors communicated to a processor circuit board assembly (PCBA) 41, which is incorporated into the assembled body for operatively controlling the illuminating elements and which can also incorporate any suitable motion control circuitry or like detection components such as an accelerometer.

Without limitation the LED display as shown can include each of upper and lower strips of LEDs which can represent first and second colors. Alternatively, and as will be further described, a single strip of LEDs can be substituted which can incorporate both of the first and second colors.

Figure 7:
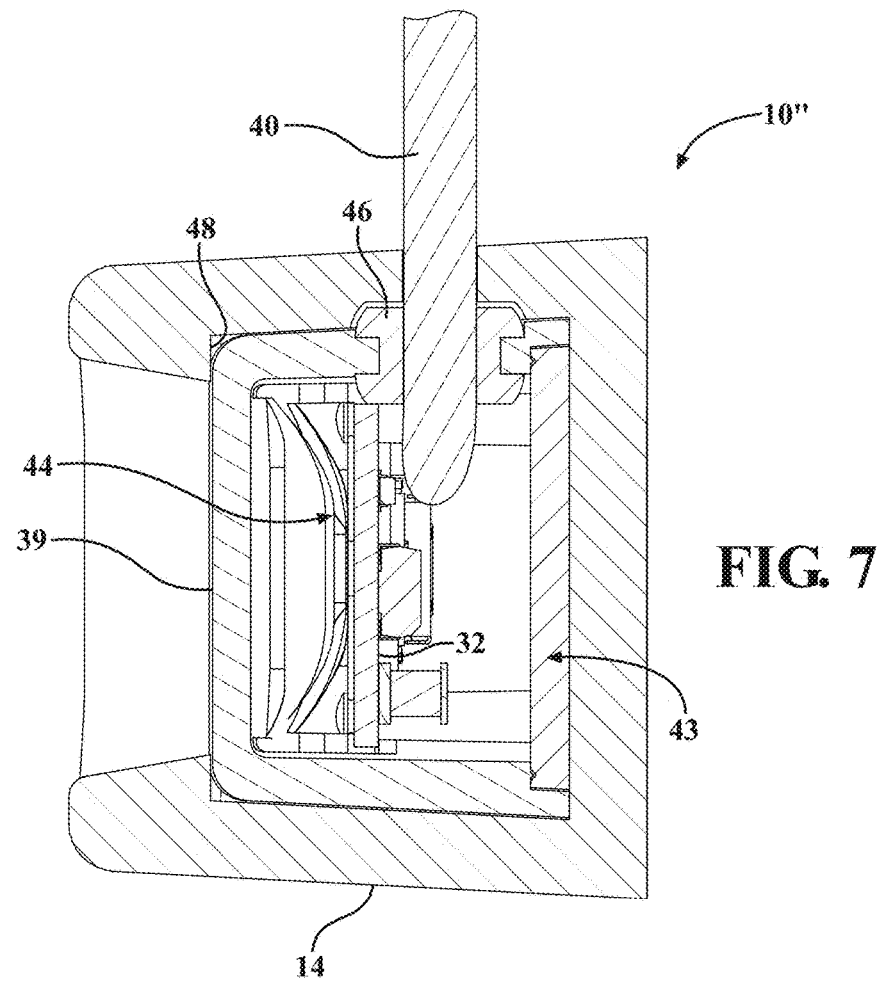
FIG. 7 is a cutaway view taken along line 7-7 of the aftermarket light assembly of FIG. 5 and depicting the features of the power supply wire, wire grommet, LED PC board, back panel, reflector, lens/housing and protective outer cover.

The cover 39 as shown exhibits a shape which seats within an inner perimeter 31 defining the main housing 14 and further includes an upper aperture 33 for receiving a cable or power wire 40 extending to a PCBA 41 (see also cutaway view of FIG. 7). In this fashion, the unit is provided as a waterproof and crush resistant assembly.

A support backing is shown at 43 with stand-off posts 45 for mounting the LED strip display 32 and PCBA 41. An electrical power supply is provided to the strip shaped body and, in a first application, includes the cable 40 extending between the PCBA 41 and a battery located in the engine compartment of the vehicle (not shown) connected to a remote end of a wiring harness.

Figure 4A:
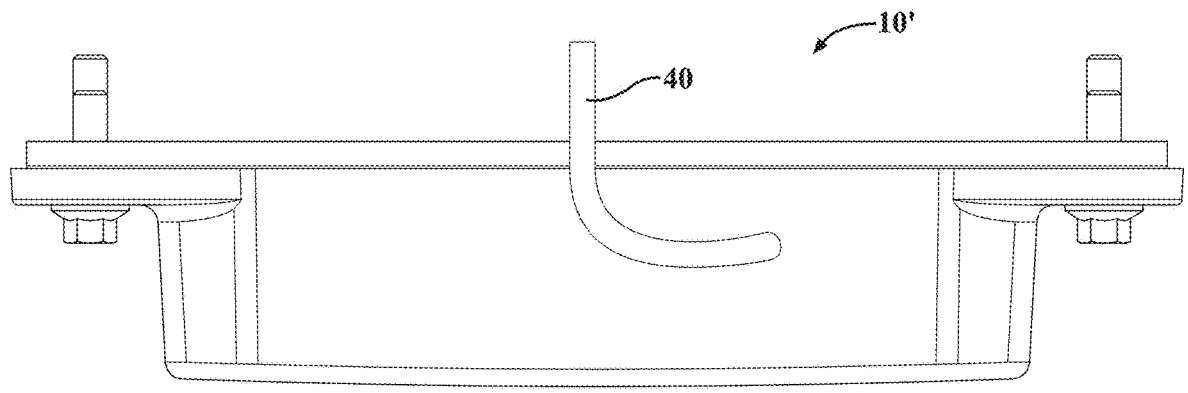
FIGS. 4A-4C presents a series of side, front and end views of a further variant of front end mounted lighting display which can be mounted to either of a license plate or bumper.
Figure 4B:
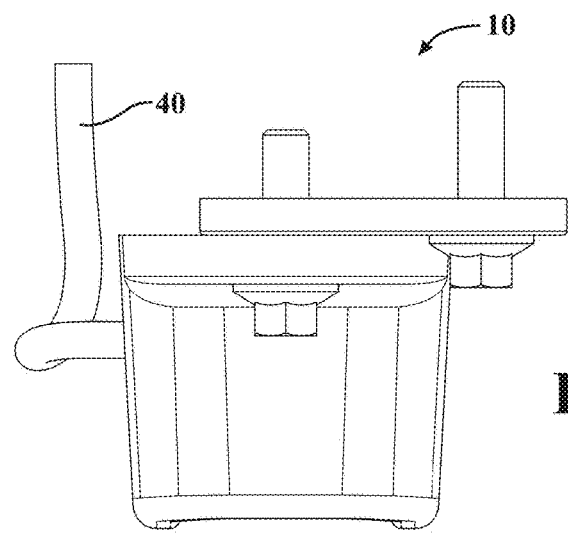
Figure 4C:
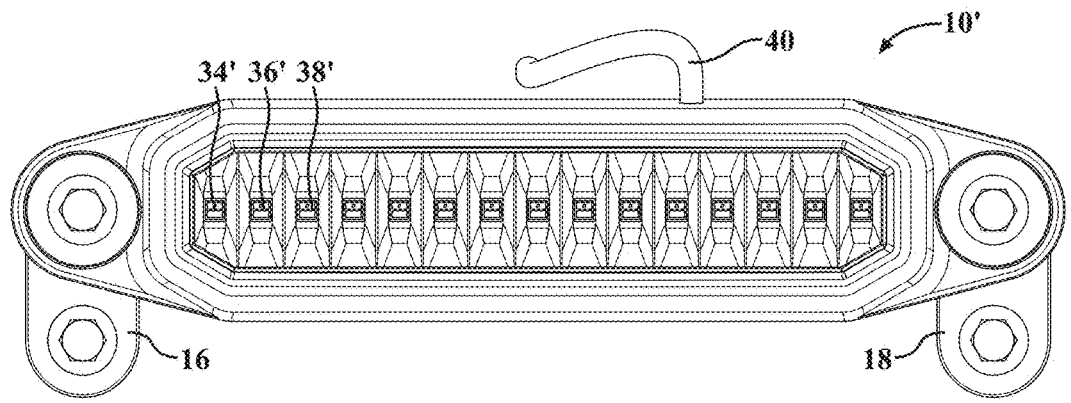

Proceeding to FIGS. 4A-4C, presented are a series of side, front and end views of a further variant of aftermarket (VFAS) front end mounted lighting display 10' which can be mounted to any of a license plate or bumper or, alternatively, to a vehicle grille location (not shown) using any arrangement of mounting hardware. An alternate arrangement of illuminating elements are shown at 34', 36', 38', et. seq. (see as additionally shown in FIGS. 5-6 and as compared to the dual layer LED arrangement in FIG. 3) and which can, without limitation, again include LED elements, with associated wiring connections again including one or more connectors communicated to a processor circuit board assembly (PCBA), again shown at 41 in FIG. 6B.

An electrical power supply is provided to the strip shaped body and again includes cable 40 extending between the PCBA 41 and a battery located in the engine compartment of the vehicle (not shown) connected to a remote end of a wiring harness. In a further application, a portable battery (not limited to any of 12V, Lithium Ion or Nickel Cadmium) can be substituted for a dedicated hookup connection for powering the PCBA, accelerometer and illuminating elements/LEDs.

Figure 5:
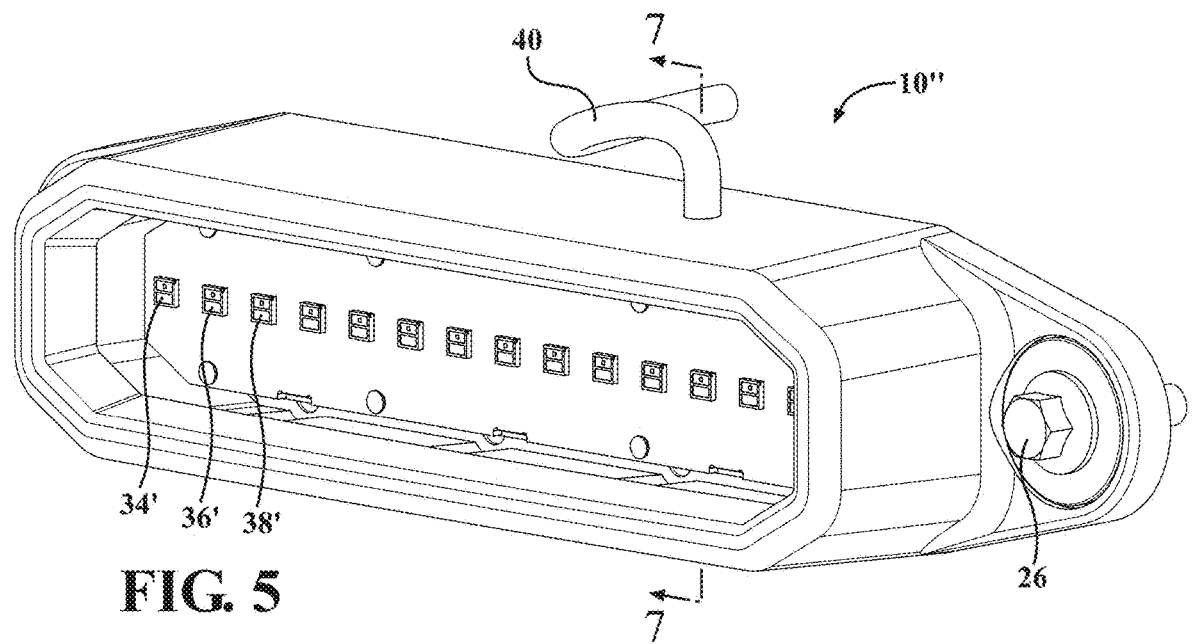
FIG. 5 presents an perspective view of the aftermarket light assembly according to a further embodiment which can be secured to a vehicle bumper.
Figure 6A:
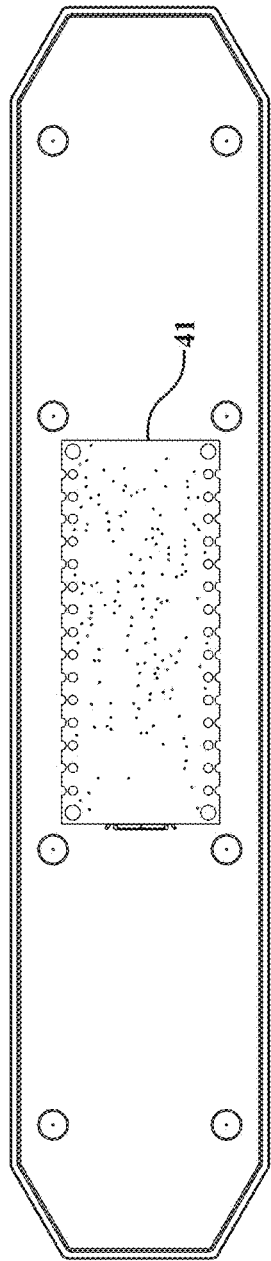
FIGS. 6A-6D present a series of front, side, rear and end views of the PCBA, LED elements and interior back panel support for incorporating into the aftermarket light assembly.
Figure 6B:
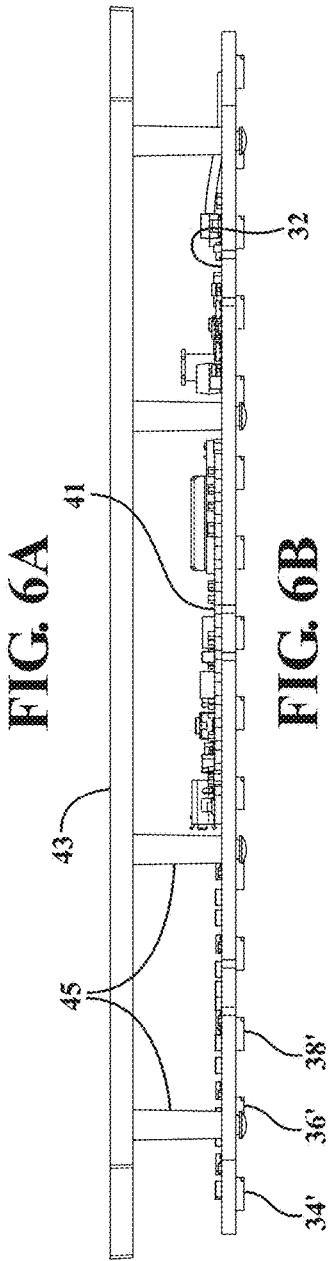
Figure 6C:
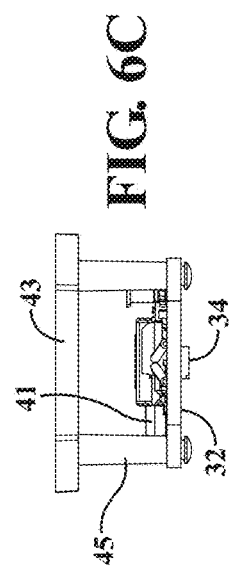
Figure 6D:
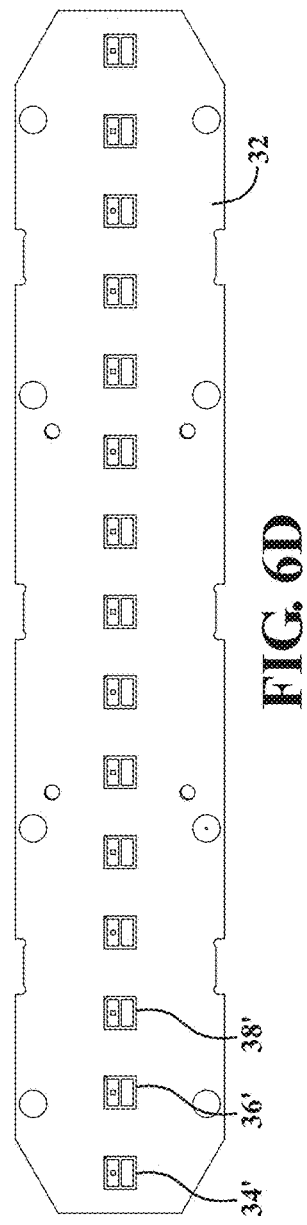

FIG. 5 presents a perspective assembled view of the aftermarket light assembly according to a further embodiment 10" which can be secured directly to a vehicle bumper (not shown). FIGS. 6A-6D present a series of front, side, rear and end views of the PCBA 41, LED elements 34', 36', 38', et seq. and interior back panel support 43 for incorporating into the aftermarket light assembly. As previously noted, the LED's can further be provided as bi-color elements including any of white, amber, yellow, red, etc.

FIG. 7 is a cutaway view taken along line 7-7 of the aftermarket light assembly of FIG. 5 and depicting the features of the power supply wire 41, wire seating grommet 46, LED PC board 41, back panel 43, reflector 44, lens/housing 39 and protective outer main or cover housing 14. In combination with previously depicted FIGS. 3 and 5, the inner perimeter rim of the main housing 14 further includes a ledge or step 48 which engages a forward outer perimeter edge of the lens housing 39 as shown and, in combination with the grommet 46, provides a sealed and watertight construction for securing to the forward vehicle bumper, grill or license plate.

Figure 8:
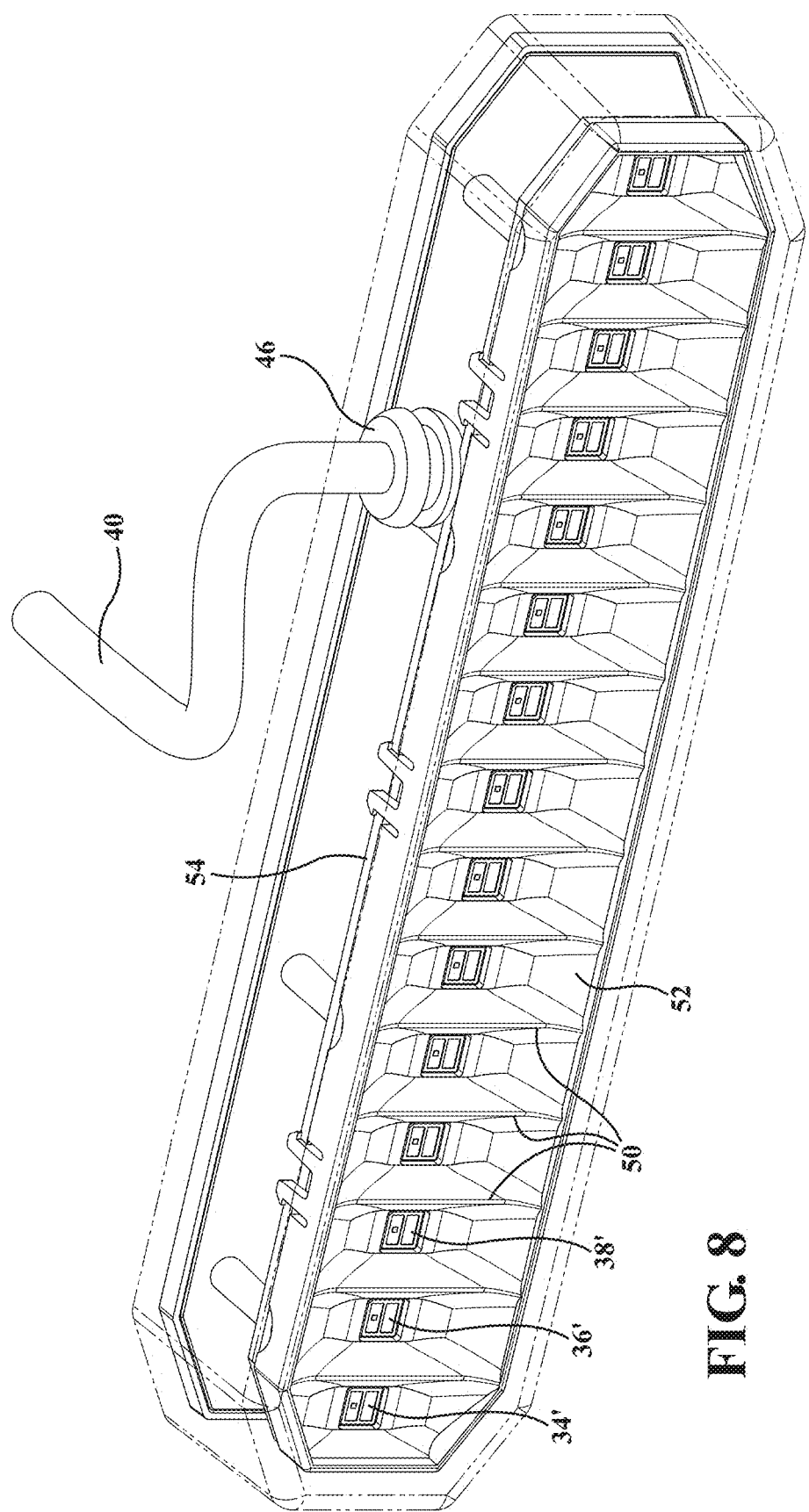
FIG. 8 is a perspective illustration similar to FIG. 5 with the protective outer cover removed and depicting the interior structure of the lighting assembly.

FIG. 8 is a perspective illustration similar to FIG. 5, with the protective outer cover removed, and depicting the interior structure of the lighting assembly. This includes a plurality of interior rib-shaped dividers 50 associated with a redesigned reflector 52 separating each of the dual color LED elements 34', 36', 38' et seq. in order to provide for a clearer visual output of any LED pattern created by the display associated with any going/slowing condition.

Figure 9A:
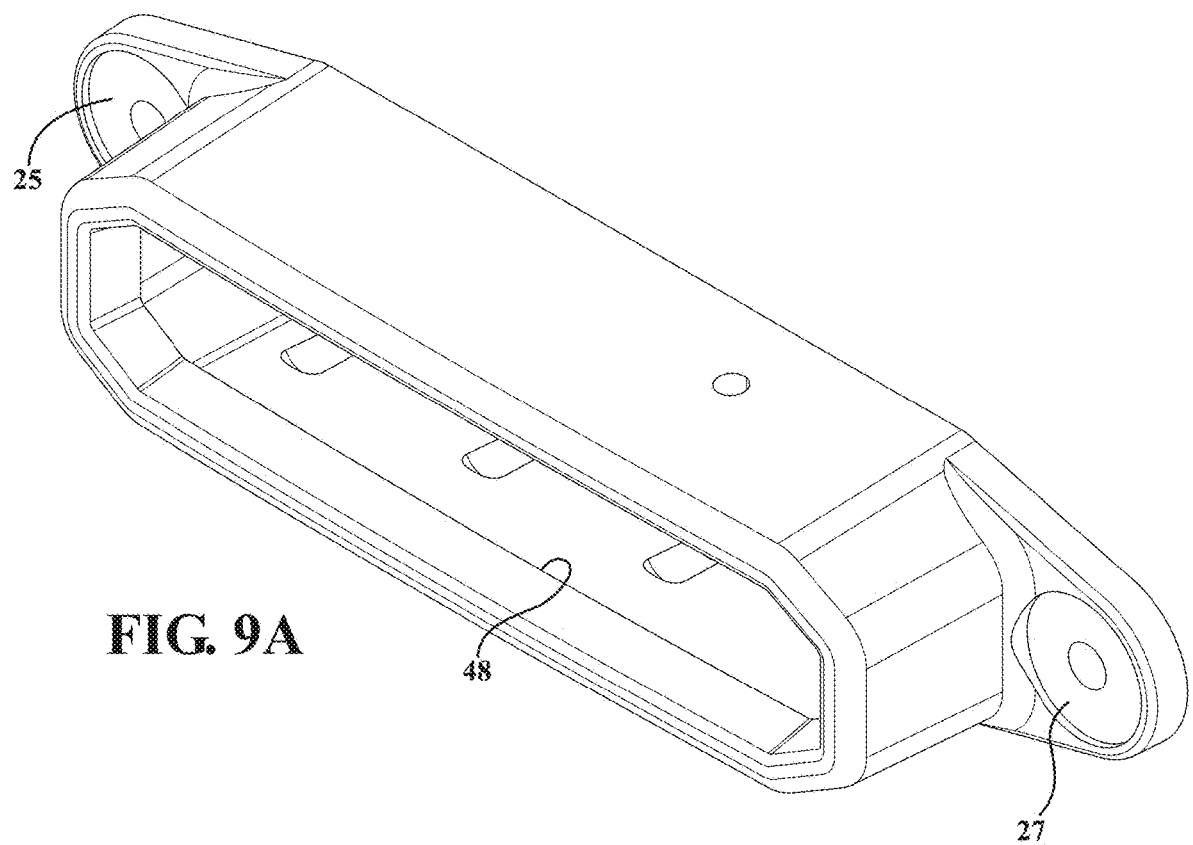
FIGS. 9A and 9B depict each of whole and cross sectioned views of the outer cover incorporating the aftermarket light assembly.
Figure 9B:
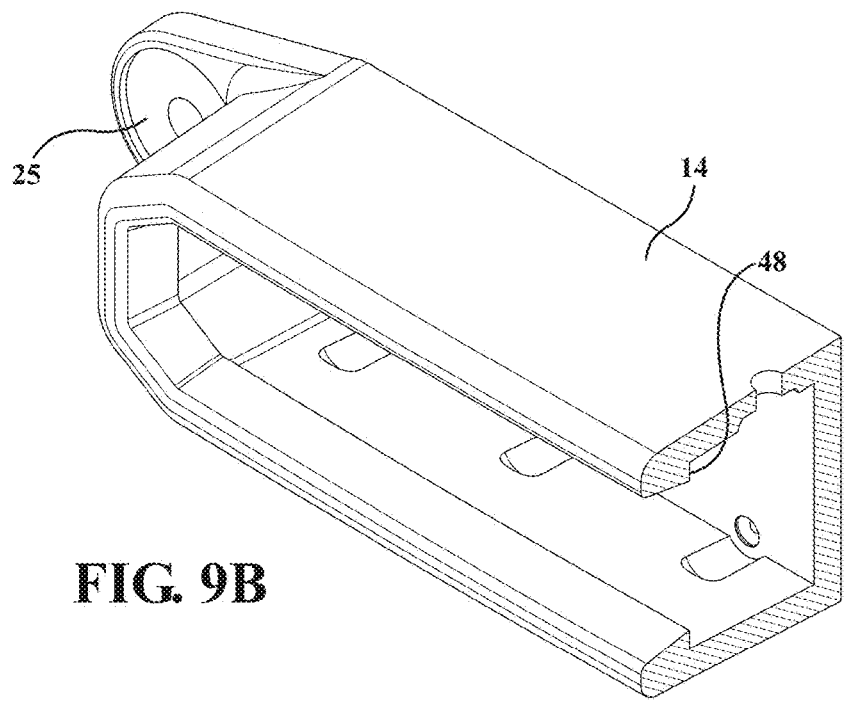
Figure 10:
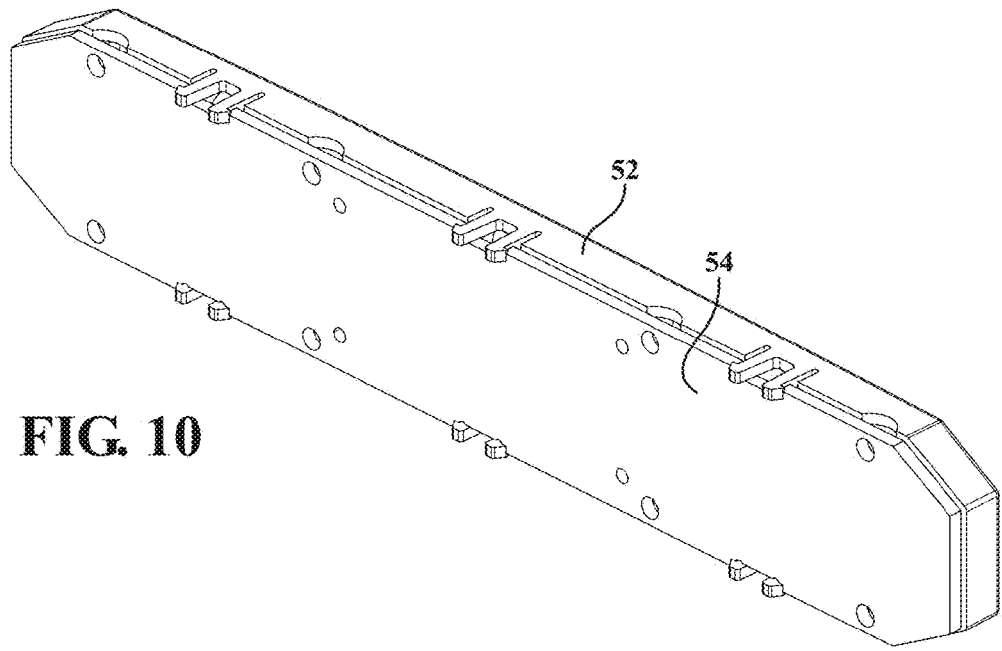
FIG. 10 is a perspective rear view of the LED PC board and reflector component subassembly.
Figure 11:
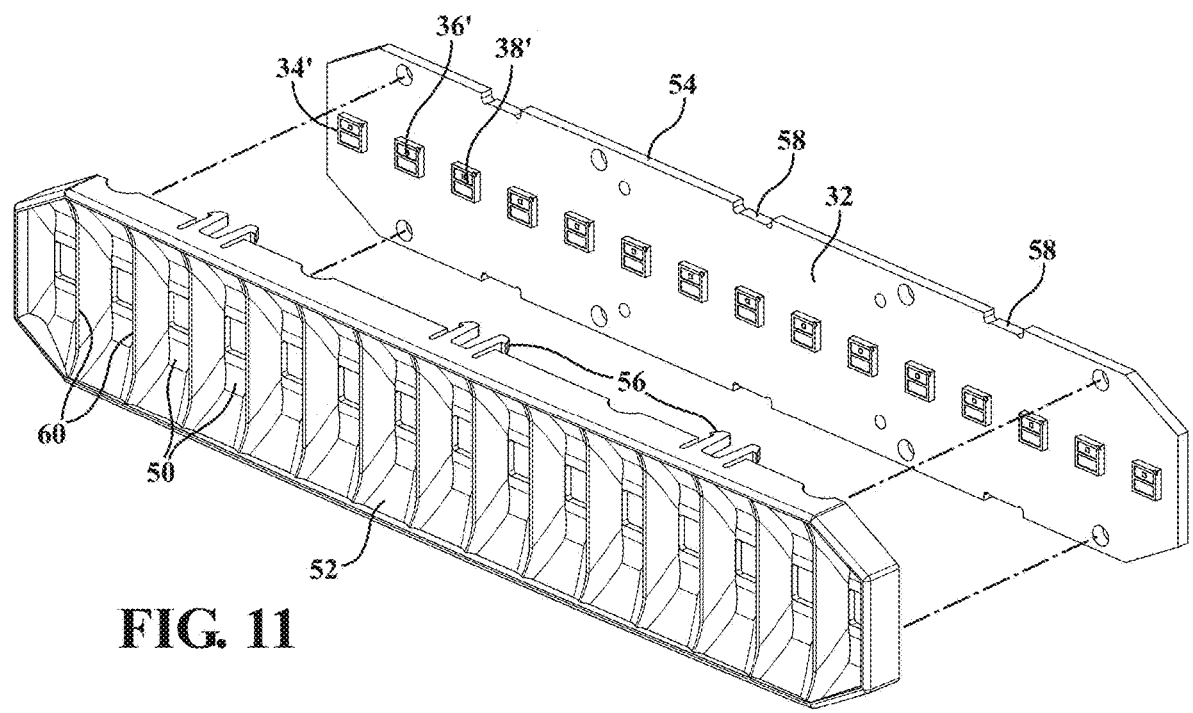
FIG. 11 is a one hundred and eighty degree rotated and exploded view of the LED PC board and reflector component subassembly depicted in FIG. 10.

FIGS. 9A and 9B depict each of whole and cross-sectioned views of the outer cover 14 incorporating the aftermarket light assembly and as previously depicted in FIG. 7. FIG. 10 is a perspective rear view of the LED PC board 54 and reflector component 52 subassembly, with FIG. 11 further depicting a one hundred and eighty degree rotated and exploded view of the LED PC board 54 and reflector component subassembly 52 depicted in FIG. 10. As shown, the reflector 52 includes clips 56 which seat with edge defined recesses 58 in order to mount the dual color LED components through seating apertures 60 configured into the reflector component.

Proceeding to FIG. 12, a width cutaway is shown of the lighting assembly similar to as shown in FIG. 4A, with FIG. 13 presenting a rotated cutaway view taken along line 13-13 of FIG. 12 and further depicting the arrangement of interior components of the lighting assembly shown in FIG. 7, with the exception of a redesigned reflector component.

Figure 14:
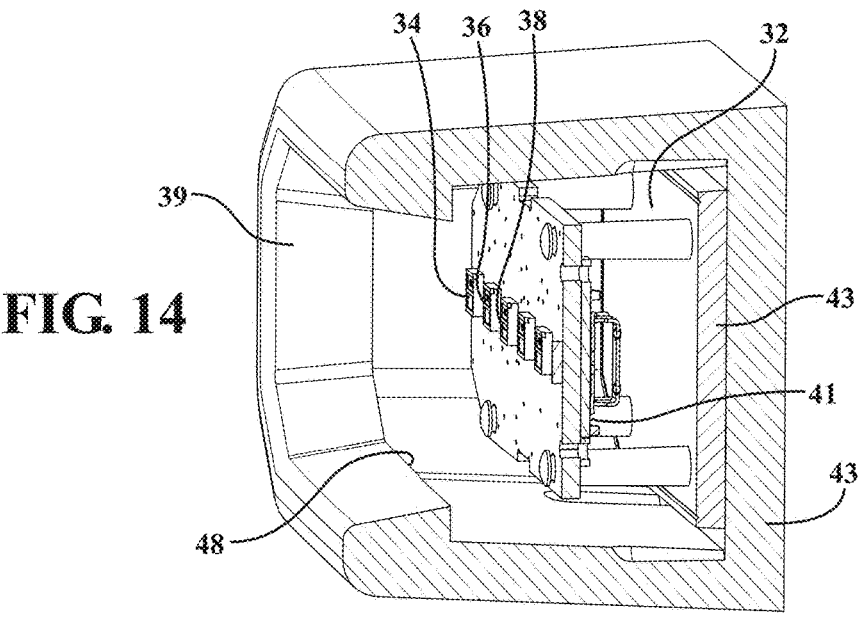
FIG. 14 presents a rotated and opposite end cutaway view similar to FIG. 13 and showing the LED PC Board, reflector and inner back panel support.
Figure 15:
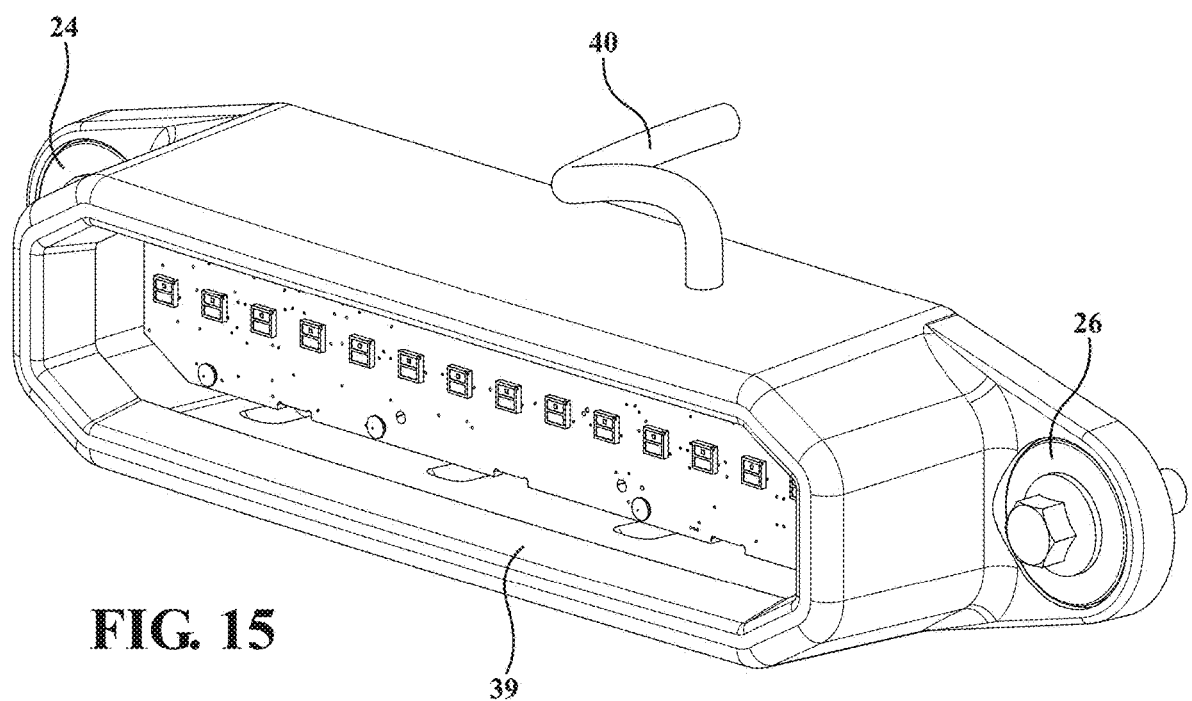
FIG. 15 is a perspective similar to FIG. 5 of the aftermarket light assembly according to a further embodiment and depicting an alternate configuration of the LED segments incorporated into the PC Board arrangement.

FIG. 14 presents a rotated and opposite end cutaway view similar to FIG. 13 and showing the LED PC Board 41, cover 39 and inner back panel support 43. FIG. 15 presents a perspective similar to FIG. 5 of the aftermarket light assembly according to a further embodiment and depicting the alternate configuration of the LED segments, again shown by pairs 34, 36, 38, et seq. which can be single or dual colored, which are incorporated into the PC Board arrangement (see again PCB board 41 backing cover plate 32 integrating the LED's).

Figure 16:
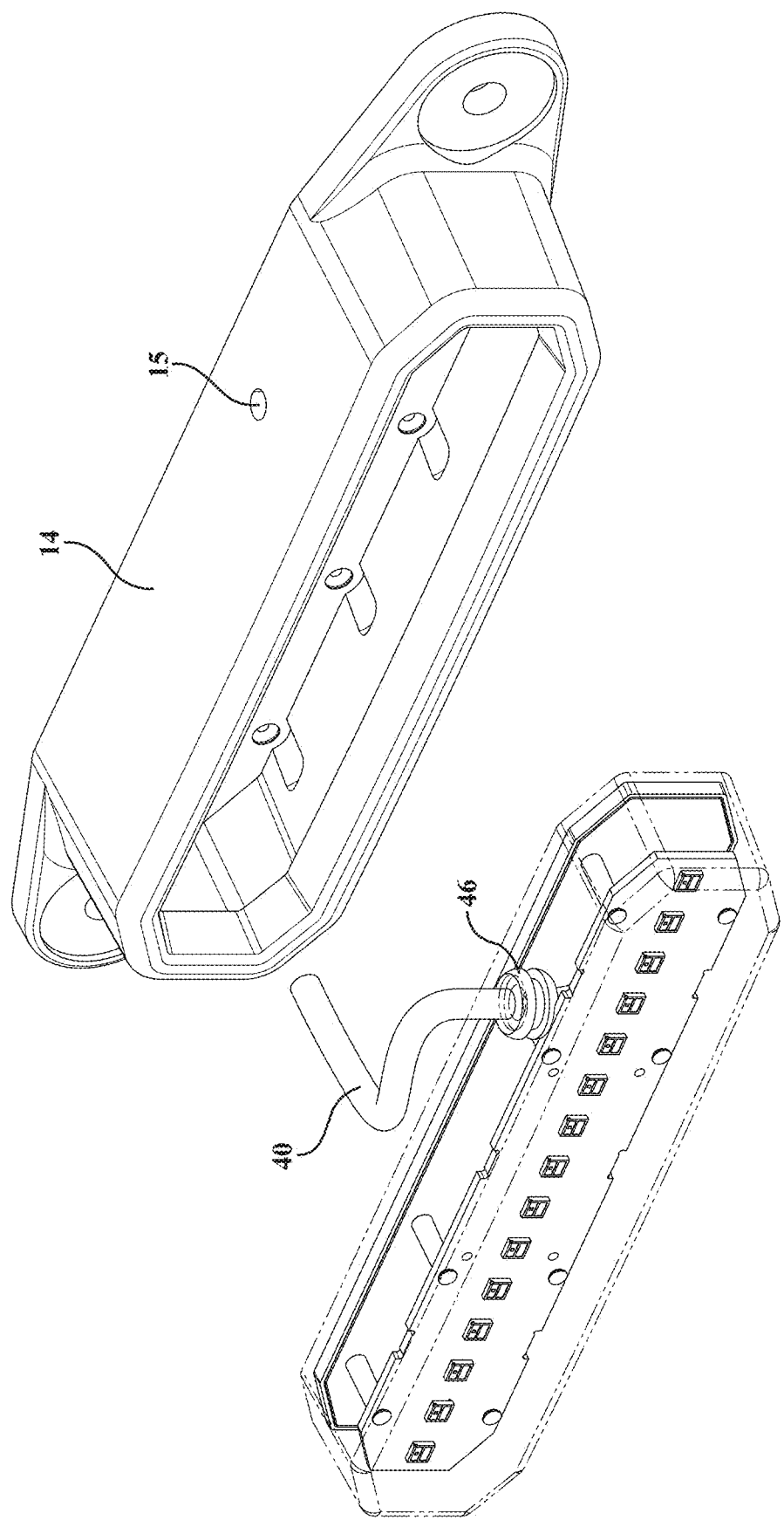
FIG. 16 is a partial exploded view of the light assembly of FIG. 15.
Figure 17:
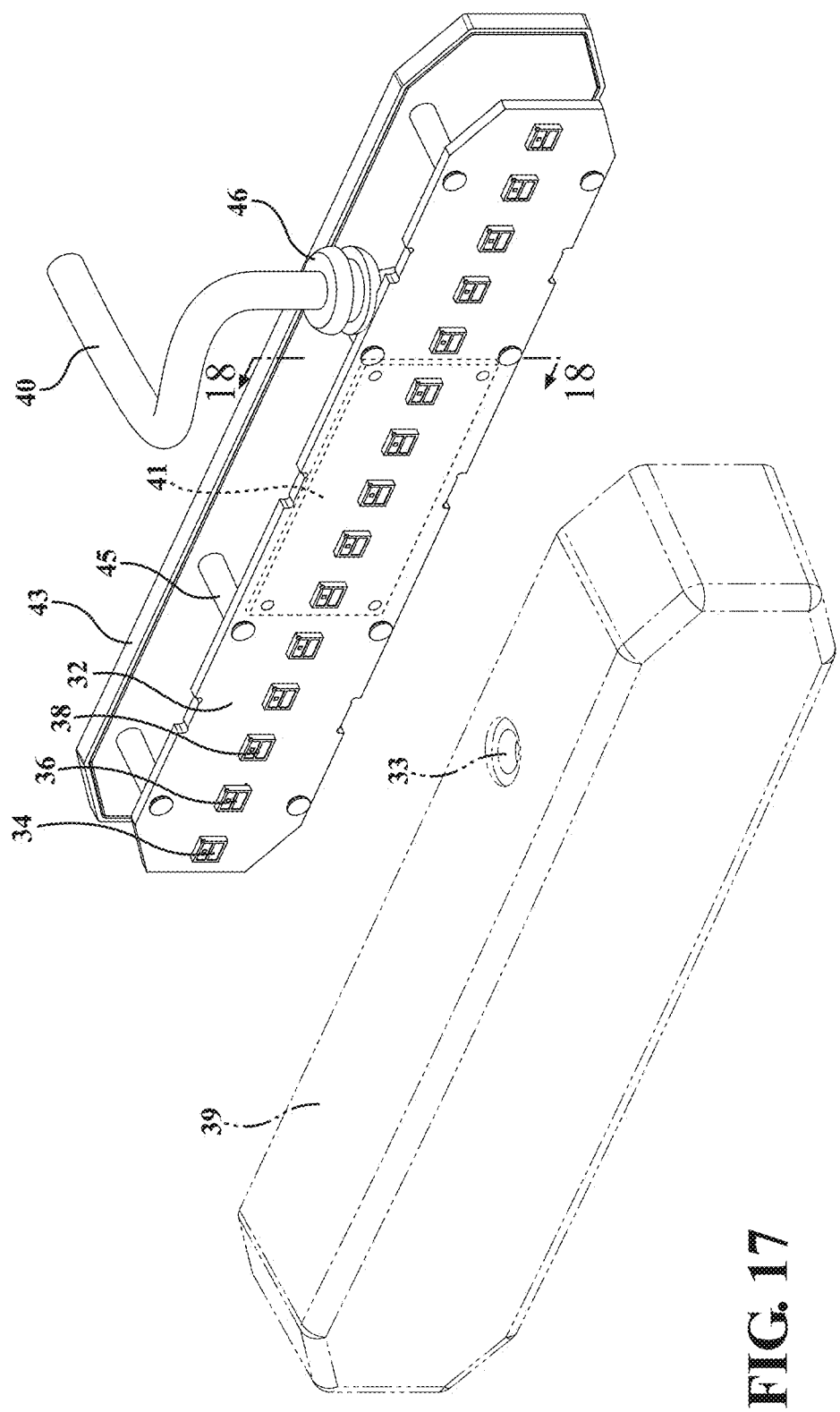
FIG. 17 presents a further partial exploded view and depicting the front cover housing shown separated from the PCB board and LED segments.
Figure 18:
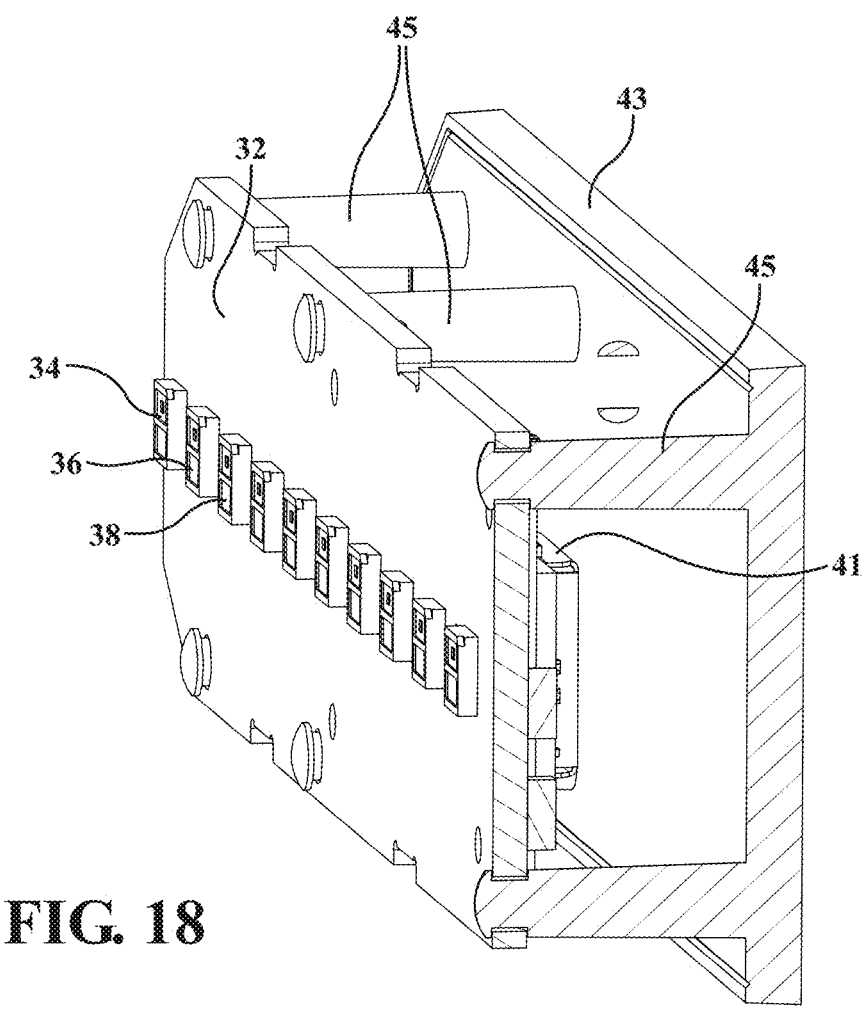
FIG. 18 is a cutaway view taken along line 18-18 of FIG. 17 and better depicting the inner components of the lighting assembly according to the configuration of FIG. 15.

FIG. 16 is a partial exploded view of the light assembly of FIG. 15. FIG. 17 presents a further partial exploded view and depicting the front cover housing shown separated from the PCB board and LED segments. Finally, FIG. 18 presents a cutaway view taken along line 18-18 of FIG. 17 and better depicting the inner components of the lighting assembly according to the configuration of FIG. 15.

As previously noted, the process and motion control circuitry incorporated into the present assembly also contemplates augmenting or substituting an accelerometer component by utilizing the vehicle onboard diagnostic port (OBD or OBD2), which can either provide power to the assembly in a further alternate embodiment, as well as in order to access speed data (such envisioned as occurring in tandem or alternative to the use of an accelerometer component). Depending upon the application, this is beneficial for redundant data in the case of noise accelerometer data received, and/or for data fusion to improve performance of the assembly.

Additionally, the OBD port is defined as a location where a diagnostic computer is connected, and operates to diagnose and read the trouble codes from the vehicle. The most common location for the OBD port is under the steering wheel on the driver's side. Another common place is near the center console panel, and sometimes even under the dashboard on the passenger side. The present invention also contemplates connecting any of ITM (Information Technology Management), OEM (Original Equipment Manufacturer) and aftermarket devices to the OBD port, such as which can interface with the present assembly in order to increase both its functional and operational applications.

As is further known, the LEDs are a subset of electroluminescent lamps, generally defined as devices, which convert electrical energy into light or luminescence, with the term luminescence generally associated with items that generate light. In the case of electroluminescence, an electric field (voltage) applied to a thin phosphor layer produces light. Without limitation, the LEDs can be substituted with any other suitable illuminating elements within the scope of the present invention.

As is further understood, the PCBA component includes the accelerometer component (also not shown), which can also be incorporated directly into the PCBA. As best shown in the illustrations provided, the wiring connections are split into subset pluralities extending through each of individual illuminating strips, it being understood that additional embodiments can be substituted for that shown and contemplate any of the use of a single connecting strip, other multiple connecting strips or of substituting the wiring connections and associated connecting strips entirely in favor of any wireless connection not limited to Bluetooth®, NFC (near field communication) or other short range wireless connectivity technology configured between the PCBA and accelerometer to the individual LEDs/illuminating strips. It is also envisioned that a Bluetooth or NFC configured network can also be established between the OBD port and the PCBA.

In this fashion, the PCBA instructs the visual output (illumination) of some or all of the LEDs/illuminating elements based on the vehicle movement sensed by the motion control circuitry/accelerometer. As is further known, the accelerometer is a device that measures the vibration, or acceleration of motion of a structure. The force caused by vibration or a change in motion (acceleration) causes the mass to "squeeze" the piezoelectric material, which produces an electrical charge that is proportional to the force exerted upon it. Since the charge is proportional to the force, and the mass is a constant, then the charge is also proportional to the acceleration.

In this manner, an accelerometer works using an electromechanical sensor to measure dynamic acceleration, defined as non-uniform acceleration forces when compared to its previous state. The theory behind accelerometers is that they can detect acceleration and convert it into measurable quantities like electrical signals.

In one non-limiting operation, the PCBA instructs a first visual output by the illuminating elements representative of a first steady or accelerating movement condition (this generally representing to the forward located observer that the vehicle is traveling a steady motion), with a second instructed visual output further representative of a decelerating or braking condition of the subject vehicle (additional visual outputs can also represent other non-constant travel conditions such as for vehicle acceleration).

The visual outputs envisioned by the present invention can include a number of different representations, such as including but not limited to providing multiple animation sequences presented by the LEDs or other suitable electroluminescent elements, a first of which can include providing the first output in a first color (such as including but not limited to a white LED strip), with the second output provided in a second color (such as further including but not limited to a yellow or amber LED strip). It is further envisioned and understood that the first and second visual representations can be provided according to any of varying illumination intensities, flashing or fluctuating patterns, or the like, such further utilizing any of multiple different colors or a single color.

Without limitation, the illumination elements provided herein can respond to the instructions of the processor and accelerometer components (which in turn is in response to the travel condition of the vehicle) in order to provide any of solid or flashing/fluctuating patterns. This can, in one non-limiting example, a lighting fluctuation pattern determined by obtaining a first speed of a vehicle and, if the first speed is over a threshold speed, the plurality of light elements on the light strip illuminates a solid first color. If the first speed is under the threshold speed, a first light element in the strip can be powered for a given time interval and a second light element in the strip is powered for a further time interval, with the plurality of light elements emanating a second color, such as when the vehicle is decelerating when under the threshold speed. First and second fluctuating light patterns from the first and second colored lights can further result from values determined by the processor representative of any of acceleration, decelerating or braking conditions.

Additional features can include the provision of an ambient light sensor (also termed ALS) for managing the lighting/LED 34, 36, 38, et seq. intensity based upon exterior lighting conditions. By definition, an ALS is a photodetector that is used to sense the amount of ambient light present and, in response, adjusting the output intensity of the lights to match the ambient environment.

In operation, ambient light sensors (ALS) detect the amount of light in the environment and are used by systems that need this information such as headlight controls, interior lighting controls, and climate controls. Light sensors are generally based on one of three types of components: photoresistors, photodiodes or phototransistors.

Photoresistors or Photocells are two terminal components, and (as the name implies) the resistance between these terminals varies depending on the amount of light striking the component face. The resistance is proportional to changes in light intensity. However, they are relatively inaccurate and have a property called light "memory" which makes its response to a given light level dependent on previous ambient light levels. Photoresistors require external calibration in all but the simplest applications due to the variation in sensitivity between units and are generally the least expensive light detecting option and have a relatively slow (measured in milliseconds) response time.

Photodiodes are also two terminal components and are capable of developing a voltage across the terminals that is proportional to the amount of light striking the sensor surface. Photodiodes exhibit a linear relationship between their output current and the illumination level.

Phototransistors are two terminal transistors. The third terminal, the base in a bipolar transistor or the gate in a field-effect transistor, is replaced by the light collecting surface. The amount of light striking the surface supplies the base (or gate) current and regulates the amount of current that can flow from the collector to emitter (or source to drain). Phototransistors produce an output current proportional to the incident light intensity and are generally much faster than photoresistors and do not have the light "memory" property. However, the variation in sensitivity can be ±50% or more between units. Phototransistors are slightly more expensive than the other options, but they are more versatile and have quick (measured in nanoseconds) response times.

It is generally desirable for ambient light sensors to imitate the sensitivity of human eyes over the visual spectral range (380 nm to 780 nm with a peak response wavelength of about 550 nm). Unfortunately, most sensor's spectral response is not the same as the human eye because unlike the human eye, ambient light sensors generally respond to infrared (IR) and ultraviolet (UV) light as well. Therefore, displays and light brightness controlled by ambient light sensors may not be optimal for human eyes if IR light is not properly compensated. This issue can be addressed by self-compensating circuits or by using an IR filter within the unit.

Ambient light sensor products are gaining popularity as effective solutions for power management and increasing display quality in electronic products and systems. The battery life for portable electronics such as a cell phone or power savings in headlights can be increased significantly by automatic brightness control through ambient light sensor feedback.

Further to the above-description, and beyond that shown, the ALS can be located upon any of numerous locations including on the PCBA 41 as shown in FIG. 10. Beyond that, the ALS can also be relocated to any of the laminated circuit or other existing automotive systems which is optimized for sensing the ambient lighting conditions and providing the necessary illumination adjustment to the illuminating elements/LED's.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A forward mountable aftermarket visual front alert system for instructing observers as to movement of the vehicle, said system comprising:
    a housing incorporating a plurality of illuminating elements configured in a strip extending substantially the length thereof and communicating with a processor also integrated into said body and incorporating a motion control circuitry;
    a forward facing translucent or transparent cover which is mounted over the front face of the housing;
    a bracket adapted for mounting the body to the vehicle;
    a power supply operating said processor and illuminating elements;
    in response to a travel condition of the vehicle, said motion control circuitry outputting a signal to said processor which is representative of the vehicle movement; and
    said processor in turn signaling said illuminating elements to generate a visual output corresponding to said signal.

2. The visual front alert system of claim 1, said bracket further comprising an elongated shape with angled ends, through which are formed apertures for receiving mounting bolts for mounting each of said body to said bracket and said bracket in turn to an upper aligning pair of inner circumferential rim defining apertures of a license plate associated with the vehicle.

3. The visual front alert system of claim 1, said forward cover further comprising a high-impact polycarbonate material.

4. The visual front alert system of claim 1, said visual output further comprising a first output representative of a steady or accelerating motion of the vehicle, and a second output further representative of a decelerating or braking condition of the vehicle.

5. The visual front alert system of claim 1, further wiring connections extending from said illuminating elements to said processor.

6. The visual front alert system of claim 1, said illuminating elements further comprising LEDs.

7. The visual front alert system of claim 1, further comprising said power supply including a cable extending between said processor and a battery of the vehicle including, without limitation, accessing a vehicle onboard diagnostic port.

8. The visual front alert system of claim 1, further comprising said body being constructed of a plasticized material.

9. The visual front alert system of claim 8, said body further comprising a multi-sided elongated shape over which is attached a light transmitting cover.

10. The visual front alert system of claim 1, said strip further comprising a first LED strip having a first color and a second LED strip having a second color.

11. The visual front alert system of claim 1, said strip of illuminating elements further comprising subdivided segments for providing said visual output according to any of a following or tracking pattern.

12. The visual front alert system of claim 1, further comprising any of accessing power or speed data by connecting said processor to an OBD2 port.

13. The visual front alert system of claim 1, further comprising an ambient light sensor associated with said processor component for managing an intensity of said illuminating elements based upon ambient lighting conditions.

14. A mountable aftermarket visual front alert system for instructing observers as to movement of the vehicle, said system comprising:
   a housing incorporating a processor communicating with a plurality of illuminating elements configured in a strip extending substantially the length thereof of said housing;
   a forward facing translucent or transparent cover which is mounted over the front face of the housing;
   a bracket adapted for mounting the body to a forward facing location of the vehicle;
   a power supply operating said processor and illuminating elements;
   in response to a travel condition of the vehicle, motion control circuitry communicating with said processor for outputting a signal which is representative of the vehicle movement; and
   said processor in turn signaling said illuminating elements to generate a visual output corresponding to said signal.

15. The visual front alert system of claim 14, said bracket further comprising an elongated shape with angled ends through which are formed apertures for receiving mounting bolts for mounting said housing to said bracket and said bracket to an upper aligning pair of rim defining apertures of a license plate of the vehicle, said housing further including aperture end tabs which receive said bolts.

16. The visual front alert system of claim 14, said visual output further comprising a first output representative of a steady or accelerating motion of the vehicle, and a second output further representative of a decelerating or braking condition of the vehicle.

17. The visual front alert system of claim 14, further wiring connections extending from said illuminating elements to said processor.

18. The visual front alert system of claim 14, said illuminating elements further comprising LEDs.

19. The visual front alert system of claim 14, further comprising said power supply including a cable extending between said processor and a battery of the vehicle including, without limitation, accessing a vehicle onboard diagnostic port.

20. The visual front alert system of claim 14, said strip further comprising a first LED strip having a first color and a second LED strip having a second color.

21. The visual front alert system of claim 14, said strip of illuminating elements further comprising subdivided segments for providing said visual output according to any of a following or tracking pattern.

22. The visual front alert system of claim 14, further comprising an ambient light sensor associated with said processor component for managing an intensity of said illuminating elements based upon ambient lighting conditions.

* * * * *